May 16, 1972   L. H. ELLISON   3,663,432
SELF-CLEANING ASH TRAY FOR VEHICLES AND THE LIKE
Filed Aug. 14, 1970
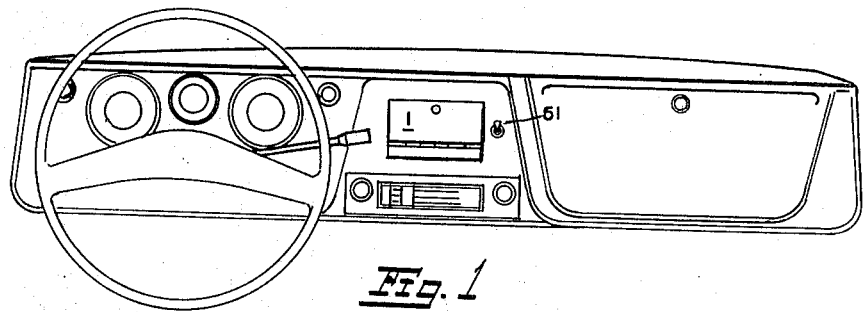
Fig. 1
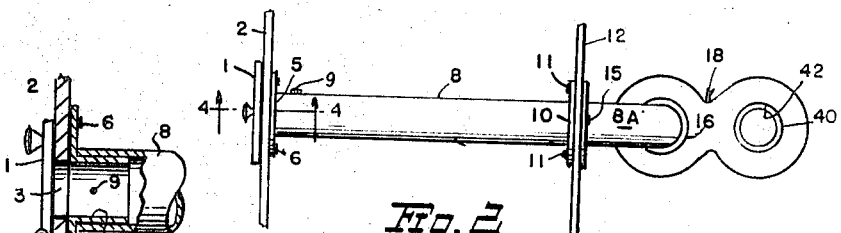
Fig. 2
Fig. 4
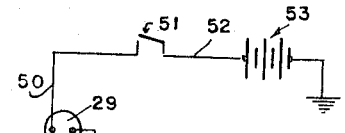
Fig. 7
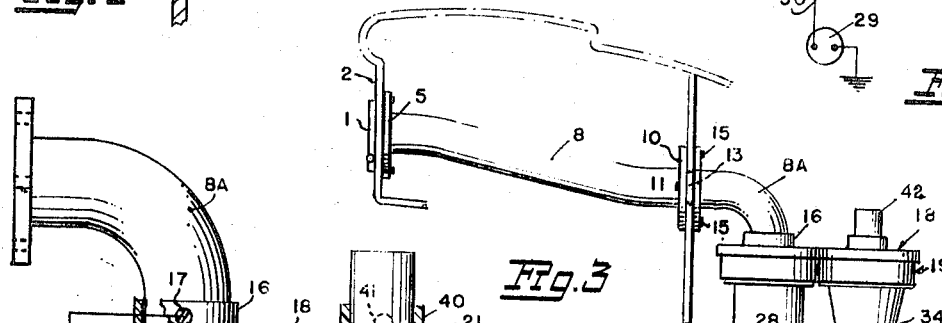
Fig. 3
Fig. 5
Fig. 6
LLOYD H. ELLISON
INVENTOR.
BY *James D. Givnan*
ATT'Y

United States Patent Office 3,663,432
Patented May 16, 1972

3,663,432
SELF-CLEANING ASH TRAY FOR VEHICLES AND THE LIKE
Lloyd H. Ellison, 2735 NW. Coolidge Way, Corvallis, Oreg. 97330
Filed Aug. 14, 1970, Ser. No. 63,797
Int. Cl. C65d 3/08
U.S. Cl. 206—19.5 C  3 Claims

ABSTRACT OF THE DISCLOSURE

A receptacle for cigar and cigarette stubs, ashes, and similar waste material. The receptacle is accessible through a doorway in the dashboard of a vehicle and in communication through an air duct with a container disposed within the engine compartment of the vehicle. A suction fan is driven by a motor in electrical circuit with the vehicle battery through a toggle switch, or the like, mounted on the dashboard. The air stream generated by the fan conveys the deposited material from the receptacle through the air duct to the container.

---

This invention relates to new and useful improvements in ash trays for automotive vehicles and more particularly to means for collecting and extinguishing partially consumed cigarettes, cigar stubs, ashes, and similar waste material.

The principal objects of the invention are:

To provide a device of the character described which is of simple, efficient and inexpensive construction capable of easy installation in an existing vehicle with no material modification of the vehicle construction.

To provide a device of the character described which will convey waste material from the receptacle to the container and by centrifugal action efficiently separate the material from the air stream and then by vacuum, within the container, extinguish incoming burning or smoldering material.

To provide a device as above described wherein the suction fan and driving motor unit is preferably, though not restrictively, of the low power, hand held vacuum cleaner type readily available on the market.

The foregoing and other objects of the invention will become apparent as the construction and operation of the invention are more fully hereinafter described and claimed, reference being had to the accompanying drawing forming a part hereof and in which:

FIG. 1 is an elevational view of the dashboard and instrument panel of an automotive vehicle and the usual door of an access opening through the dashboard to the disposal unit made in accordance with my invention.

FIG. 2 is a plan view of my device extending through and supported by the bulkhead or firewall of an engine compartment.

FIG. 3 is a side elevational view of FIG. 2.

FIG. 4 is a sectional detail view on an enlarged scale taken approximately along the line 4—4 of FIG. 2.

FIG. 5 is a side elevational view on an enlarged scale, partly in section and with fragments broken away, of a power-driven suction fan, a conical casing in open communication with the fan housing and a container removably secured to the bottom end of the casing.

FIG. 6 is a top plan view of FIG. 5 with a cover plate removed, and

FIG. 7 is a wiring diagram.

Referring now more particularly to the drawing wherein like reference numerals indicate like parts, numeral 1 indicates a normally self-closing door to a conventional ash tray (not shown) secured to the dashboard 2 and accessible through an opening 3 in the dashboard.

In accordance with my invention, I replace the conventional ash tray with a tubular member 4, flanged as at 5 and thereby secured as at 6 to the dashboard. The interior of the member 4 is accessible when the door 1 is opened.

One end of an air duct 8 is telescopically engaged with the tubular member 4 and removably secured thereto by a set screw 9. The opposite end of air duct 8 (FIGS. 2–3) is flanged as at 10 and secured as at 11 to the firewall 12 which has an opening 13 therethrough. As a continuation of air duct 8, I provide an elbow 8A similarly flanged at its top end and secured as at 15 to the other side of the firewall 12.

Secured to the opposite or bottom end of elbow 8A, by means of collar 16 and set screw 17, is a cover plate 18 for a housing indicated generally at 19. Housing 19 is divided into a fan compartment 20 and a compartment 21 for an annular plate generally indicated at 22, having openings 23 therethrough defined by radially disposed downwardly inclined air-deflecting louvers 23A. The two compartments 20–21 are in open communication with each other through a tangential passageway 24.

Secured as at 26 to the bottom wall 27 of housing 19 is the flanged top end of a motor housing 28 which supports a motor 29. The motor shaft 30 extends through the bottom wall 27 of housing 19 and is secured to a suction fan 31 for driving the same in a counterclockwise direction as shown in FIG. 6.

The other end of the bottom wall 27 of housing 19 has an opening 33 extending therethrough which is of a diameter equal to that of the top end of a conical casing 34 which is secured as at 35 to the bottom housing wall 27 for open communication with compartment 21.

Secured by a collar 40 and set screw 41, to the housing cover 18 is a vent pipe 42. Pipe 42 extends downwardly into the casing 34 approximately to the extent shown. The casing 34 terminates at its bottom end in a spout 44 in open communication with the interior of a container 45 whose neck is in threaded connection as at 46 with the bottom end of a cylindrical hanger 47 whose top end surrounds and is secured and sealed relative to the conical casing 34 as at 36. The bottom end of hanger 47, through which the spout 44 extends, is sealed by a disc 48. Any suitable form of rubber gasket is provided for sealing the top end of the container with respect to the disc 48. The spout is bent so that its open end is directed toward one side of the container 45, as shown.

As shown in FIG. 7, one side of the motor 29 is grounded, and its opposite side is connected by wire 50 to one side of a manually operable switch 51. The opposite side of switch 51 is connected as at 52 to a battery 53 whose opposite side is grounded as shown.

Although the switch 51 is shown and described as manually operable, this does not necessarily prescribe any such limitation since the switch could be operated by suitable linkage to the self-closing spring-loaded door 1 when the latter is swung to an open position.

When the suction fan 31 is motor-driven in the arrowed counterclockwise direction shown in FIG. 6, upon closing switch 51 on the dashboard, it will be apparent that the generated vacuum within the air duct 8 will draw the waste material from the tubular ash tray 4 through the air duct 8 and the elbow 8A, onto the fan 31 whose orbital rotation will throw the material in the direction of the arrow in FIG. 6, through passageway 24 into the compartment 21 then downwardly through the louvered openings 23. The waste material being thus subjected to centrifugal force by downward swirling motion will be thrown to the side walls of the casing 34 and gravitate through the spout 44 into the container 45, allowing clean exhaut air to pass upwardly through the vent pipe 42 to the atmosphere.

Directing the end of the spout 44 to one side of the interior of container 45 is for the purpose of breaking up the swirl of air from the conical casing 34 which would otherwise be directed to and agitate the contents of the container, and in some instances might draw the contents of the container back up into the conical casing 34.

I claim:

1. In a vehicle having a dashboard with an opening therethrough and a firewall spaced forwardly of said dashboard, the improvement comprising,
   an ash receptacle secured to said dashboard and accessible through said opening,
   an air duct extending through said firewall and in open communication at one of its ends with said ash receptacle and terminating at its opposite end forwardly of said firewall,
   a housing divided into two compartments in open communication with each other,
   means securing said housing to said terminal end of the air duct in open communication with one of said compartments,
   a motor-driven suction fan operatively disposed within said one of said housing compartments,
   a conical casing having a top end and a bottom end,
   means securing the top end of said conical casing to said housing in open communication with the other of said housing compartments,
   a disc secured between the last mentioned compartment and the top end of said conical casing,
   said disc having openings therethrough defining radially disposed downwardly inclined louvers,
   a vent pipe carried by said housing and extending downwardly into said conical housing, and
   a container removably secured to said conical casing in open communication with the interior thereof.

2. The improvement as claimed in claim 1, wherein said housing compartments are circular and in tangential communication with each other,
   a motor housing secured to and depending from said one of said housing compartments,
   a motor disposed within said motor housing, and
   said motor in electric circuitry through a switch with a source of electric current.

3. The improvement as claimed in claim 1, wherein said container is removably secured to said conical casing by a cylindrical hanger having a top end and a bottom end,
   the top end of the hanger permanently secured to said conical casing with the bottom end of the hanger in concentric spaced relation to the bottom of said conical casing,
   the bottom end of said hanger having an airtight seal therearound,
   the bottom end of said hanger being internally threaded, and
   said container having an externally threaded neck and adapted for advancement into sealed engagement with said seal.

References Cited

UNITED STATES PATENTS

| | | | |
|---|---|---|---|
| 3,500,492 | 3/1970 | Coleman | 15—313 |
| 3,250,382 | 5/1966 | Beil et al. | 206—19.5 C |
| 3,062,363 | 11/1962 | Elswood | 206—19.5 C |

LEONARD SUMMER, Primary Examiner

U.S. Cl. X.R.

15—313